US008329085B2

(12) United States Patent
Kurtz et al.

(10) Patent No.: US 8,329,085 B2
(45) Date of Patent: Dec. 11, 2012

(54) PROCESS FOR MANUFACTURING A PANEL MADE OF A THERMOPLASTIC COMPOSITE

(75) Inventors: Didier Kurtz, Pornic (FR); Stephane Pauchet, Guerande (FR); David Bouvet, Missillac (FR); Marc Challet, Saint-Nazaire (FR)

(73) Assignee: Airbus Operations SAS, Toulouse (FR)

( * ) Notice: Subject to any disclaimer, the term of this patent is extended or adjusted under 35 U.S.C. 154(b) by 299 days.

(21) Appl. No.: 12/439,177

(22) PCT Filed: Sep. 13, 2007

(86) PCT No.: PCT/EP2007/059646
§ 371 (c)(1),
(2), (4) Date: Feb. 27, 2009

(87) PCT Pub. No.: WO2008/031866
PCT Pub. Date: Mar. 20, 2008

(65) Prior Publication Data
US 2009/0321978 A1 Dec. 31, 2009

(30) Foreign Application Priority Data
Sep. 15, 2006 (FR) .................................. 06 53770

(51) Int. Cl.
*B29C 70/44* (2006.01)
(52) U.S. Cl. ........................ 264/258; 264/257
(58) Field of Classification Search .................. 264/257, 264/258
See application file for complete search history.

(56) References Cited

U.S. PATENT DOCUMENTS

| 4,783,362 | A | | 11/1988 | Thornton et al. | |
|---|---|---|---|---|---|
| 4,851,280 | A | * | 7/1989 | Gupta | 442/292 |
| 5,108,532 | A | * | 4/1992 | Thein et al. | 156/285 |
| 5,116,216 | A | | 5/1992 | Cochran et al. | |
| 5,132,070 | A | * | 7/1992 | Paul et al. | 264/258 |
| 5,236,646 | A | * | 8/1993 | Cochran et al. | 264/102 |
| 5,320,700 | A | * | 6/1994 | Hall et al. | 156/309.6 |
| 5,707,576 | A | * | 1/1998 | Asher | 264/258 |
| 5,712,017 | A | * | 1/1998 | Jordan | 428/113 |
| 6,649,006 | B2 | * | 11/2003 | Benson et al. | 156/245 |
| 6,841,021 | B1 | * | 1/2005 | Mesing et al. | 156/212 |

(Continued)

FOREIGN PATENT DOCUMENTS

| EP | 0 893 235 | | 1/1999 |
|---|---|---|---|
| EP | 1625929 A1 | * | 2/2006 |

OTHER PUBLICATIONS

Dictionary Definition of Film from Dict.org.*

(Continued)

*Primary Examiner* — Yogendra Gupta
*Assistant Examiner* — Amjad Abraham
(74) *Attorney, Agent, or Firm* — Oblon, Spivak, McClelland, Maier & Neustadt, L.L.P.

(57) ABSTRACT

A method of manufacturing a panel made of a composite material using a tool having a support on which a lay-up is performed, the lay-up producing a stack of plies of fiber prepregs, followed by consolidating the stack aiming to obtain the panel using a compacting plate arranged above the stack. The method is implemented such that a first set of polyimide films partially covering each other is located in contact with the stack of plies, between the latter and the compacting plate.

18 Claims, 4 Drawing Sheets

U.S. PATENT DOCUMENTS

| | | | |
|---|---|---|---|
| 6,860,957 B2 * | 3/2005 | Sana et al. | 156/245 |
| 7,037,865 B1 * | 5/2006 | Kimberly | 442/181 |
| 2002/0038923 A1 * | 4/2002 | Lenherr | 264/221 |
| 2005/0194724 A1 * | 9/2005 | Krogager et al. | 264/510 |
| 2006/0172111 A1 * | 8/2006 | Polus et al. | 428/73 |

OTHER PUBLICATIONS

U.S. Appl. No. 12/920,728, filed Sep. 2, 2010, Bouvet, et al.

* cited by examiner

PROCESS FOR MANUFACTURING A PANEL MADE OF A THERMOPLASTIC COMPOSITE

TECHNICAL FIELD

The present invention relates generally to a method for manufacturing a panel made of a composite material, in particular a thermoplastic composite. For information, this may in fact involve composite materials with a PEEK resin or PPS resin thermoplastic matrix and long carbon fibers, but also possibly composites with an epoxy resin thermosetting matrix and carbon fibers.

The invention preferably relates to a method for manufacturing panels having a thickness between approximately 1 and 20 mm, such as those typically found in the aeronautic field, which constitutes a particular application for the present invention. Indeed, the method which is the object of the invention can be implemented in order to obtain an aircraft fuselage panel, which usually has a fiber ratio close to 65%. To this end, implementation of the invention can indifferently lead to obtaining a substantially flat panel, or to obtaining a so-called single- or double-curvature panel traditionally found in the composition of aircraft fuselages. It is noted that in both of the aforementioned cases, the panel produced through implementation of the method according to the present invention can, of course, undergo later operations in order to constitute a ready-to-assemble fuselage panel, operations which may, for example, include trying to bring back stiffeners via continuous welding on the obtained panel, these stiffeners themselves being able to be produced by stamping of flat plates also able to be obtained according to the method of the invention.

PRIOR ART

The traditional methods for manufacturing a panel in a composite material consist overall of implementing two successive steps, namely a lay-up step followed by a consolidation step, also called compacting step.

The lay-up step consists of producing a stack of plies of resin fiber prepregs, each for example being in strip form, with the goal of obtaining a plurality of layers or folds superimposed in the direction of the stack. The consolidation step of the stack consists of obtaining the panel using a compacting plate arranged above the stack. This compacting plate makes it possible, in fact, through the application of pressure/vacuum pressure, to compact, in the direction of the stack, the unit formed by the layers of fiber prepregs, and simultaneously to evacuate the air and the gases present in the stack, such that the panel obtained has an acceptable void ratio, for example less than approximately 5%. This consolidation step of the stack also takes place by applying heating to said stack, for example by placing it in a sterilizer, in order to bring it to the temperature required to obtain the fusion of the pre-impregnated resin on the fibers, and therefore with the aim of obtaining a compact final element in one piece.

In the embodiments known from the prior art, the compacting plate usually comes into contact with the stack of plies of fibers during the consolidation step, which can harm the final quality of the panel obtained. Indeed, it is first indicated that with this method, the surface state of the compacting plate greatly risks being imprinted on the upper surface of the panel obtained at the end of the consolidation step, which may sometimes lead to incompatibility with the high surface quality demands encountered in certain fields, such as aeronautics for aircraft fuselage panels.

Furthermore, the presence of this compacting plate in contact with the stack, also called caulking plate or sheet, prevents satisfactory air evacuation from this stack during the consolidation step. This restriction can naturally lead to the appearance of porosities within the element obtained, synonymous with weakening of the overall mechanical resistance of this element.

SUBJECT OF THE INVENTION

The aim of the invention is therefore to propose a method for manufacturing a panel in a composite material resolving the aforementioned drawbacks, relative to the embodiments of the prior art.

To do this, the object of the invention is a method for manufacturing a panel in a composite material using tooling having a support on which a lay-up step is carried out consisting of producing a stack of plies of fiber prepregs, followed by a consolidation step of the stack aiming to obtain the panel using a compacting plate arranged above this stack. According to the invention, the method is implemented such that a first set of polyimide films partially covering each other is located in contact with the stack of plies, between the latter and the compacting plate.

Thus, the glossy appearance of the polyimide films located in contact with the upper surface of the stack during the consolidation step advantageously makes it possible to obtain an extremely satisfactory surface state for the obtained panel, and which is completely compatible with the high surface quality demands encountered in certain fields, such as aeronautics for aircraft fuselage panels.

Furthermore, aside from the fact that this first set of polyimide films advantageously makes it possible to prevent the imprinting of the surface state of the compacting plate on the upper surface of the stack, this assembly also advantageously allows excellent drainage of gases during the consolidation step. This is explained by the possible evacuation of the air and gases initially found inside the stack, through the overlapping zones of the polyimide films therefore advantageously forming an assembly not ensuring total sealing to the gases toward the top, in the direction of the stack of plies of fibers.

The air evacuation done is thus satisfactory, and makes it possible to arrive at a panel having a reduced void rate in relation to that encountered previously, granting it particularly good overall mechanical resistance properties.

The polyimide films used for the implementation of the invention can be produced using any manner known by those skilled in the art, by reaction between an aromatic tetracarboxylic dianhydride and an aromatic diamine. The thickness of these films can for example be in the vicinity of 30 µm, and more generally between about 20 and 50 µm.

For information, the following films, available on the market, can be used:

Thermalimide 50 micron FILM by the company AIRTECH®;

Thermalimide 50 micron FILM by the company RICHMOND® (Ref: UHT750); or

Thermalimide 50 micron FILM by the company KANEKA® (Ref: 200AV).

In general, due to the small thickness of these films, the overlap/covering zones thereof only allow superficial marks from imprinting to appear on the surface of the stack after the consolidation thereof, these marks in no way damaging the surface state, and not significantly weakening the overall mechanical characteristics of the obtained panel.

The polyimide films used, also called "thermalimides", are naturally chosen to resist the high temperatures implemented during the consolidation step of the stack, which can reach 400° C. or more. These not having to be integrated into the final panel, they are therefore provided in order to be easily removed from the upper surface of the compacted stack or of the compacting plate, for example by peeling. In the case most often encountered where the films used do not adhere to the upper surface of the compacted stack or to the compacting plate at the end of the consolidation step, the removal of these polyimide films obviously does not pose any particular concern.

Preferably, the method is implemented such that a second set of polyimide films partially covering each other is located in contact with the stack of plies, between the latter and the support of the tooling.

Thus, the advantageous characteristics described above and obtained on the upper surface of the panel constituted by the compacted stack can then also be procured for the lower surface of this panel due to the presence of this second set of polyimide films. Indeed, with such an implementation, the surface state of the tooling support is advantageously no longer imprinted on the lower surface of the panel, since during the consolidation step, the lower part of the stack is in contact with the polyimide films covering a glossy appearance.

For information, it is preferable to offset the overlapping zones of the first and second sets of polyimide films considered along the direction of the stack of the plies of fibers, namely not to arrange these overlapping zones across from each other two by two in this direction, even if this of course remains possible, without going outside the framework of the invention.

Preferably, the method also comprises a step for placement on the compacting plate of a first drainage fabric, this step being implemented such that the first fabric is located in contact with this compacting plate and separated from the first set of polyimide films by this same plate, therefore implying that the two opposite surfaces of the compacting plate are in contact with the first set of films and with the first drainage fabric, respectively. It also includes a step for placement on the tooling support of a second drainage fabric, this step being implemented such that the second drainage fabric is located in contact with the support of the tooling, between the latter part and the second set of polyimide films.

The aforementioned fabrics then make it possible to perform satisfactory draining of the gases during the consolidation step of the stack, in connection with the set of polyimide films partially overlapping each other.

Still preferably, the method also comprises a step for placement of at least one wedge limiting the edge effects likely to occur during the later consolidation step of the stack, each wedge being arranged along one edge of this stack. Preferably, the entirety of the perimeter of the stack is equipped with such wedges, which therefore allow savings in material. The positive influence on the aforementioned edge effects results from the fact that these wedges make it possible to limit the flow of transverse material. Indeed, during the compacting operation, the compacting plate "presses on" the stack of plies. Under the effect of this pressure, the resin, which is very fluid at this temperature, tends to flow toward the edge of the plate. It "abuts" against the aforementioned wedges, also called caulking wedges. When the compacting plate reaches the caulking wedges, it exerts a normal stress thereon upon contact. Each wedge is thus subjected, in the plane of the folds, to the thrust of the resin, the normal effect of the compacting plate and its reaction on the marble plate, and therefore lastly to the friction between the compacting plate, on one hand, and the marble plate on the other hand. This friction then prevents the wedges from moving under the effect of the pressure from the resin, and therefore limits the creep of the latter and the thinning of the edges of the obtained panel.

Preferably, each wedge limiting the edge effects has a thickness approximately equal to that of the panel designed to be obtained from the stack, at the end of the consolidation step of this stack. This specificity therefore also advantageously makes it possible to control the final thickness of the plate, which may therefore be smaller than that of the wedges. For information, one provides that the thickness of the wedges is, at all points of the periphery of the stack, slightly smaller than that of the final panel, for example with a size in the vicinity of 0.1 to 0.5 mm.

However, it is alternatively possible to provide wedges whereof the initial (nominal) thickness is, at any point of the periphery of the stack, slightly larger than that of the final panel, for example with a size in the vicinity of 0.1 to 0.5 mm. In such a case, one then makes these wedges deformable by compression during consolidation in order, naturally, to be able to obtain the panel with the desired thickness. As an illustrative example, the wedges can thus be produced in a high-temperature elastomer, such as 691PX silicone. With such a configuration, the edge effects are then completely eliminated.

In other words, one makes each wedge limiting edge effects have an initial thickness larger than that of the panel designed to be obtained from the stack, at the end of the consolidation step of this stack, each wedge then being designed and arranged so as to be deformed by compression by the compacting plate, during the implementation of this consolidation step.

Furthermore, it is possible to act such that each wedge limiting edge effects has at least one surface provided with a plurality of drain grooves, still with the aim of obtaining better draining of gases during the consolidation step of the stack. For information, these grooves are preferably formed on the two surfaces opposite the caulking wedges, namely the surface in contact with the compacting plate and the surface in contact with the marble plate serving as support. Their relative positioning is preferably in staggered rows of one surface relative to the other.

Furthermore, the consolidation step of the stack can be done on one hand by applying a vacuum pressure within a sealed chamber partially defined by the support and in which the stack of plies and the compacting plate are located, and on the other hand by heating this same stack of plies of fiber prepregs. However, pressure may alternatively be implemented to compact the stack of plies of fibers without going outside the framework of the invention, even though this solution appears less relevant than that described above.

In the preferential case of the application of a vacuum pressure, one provides that the tooling also includes means for applying negative pressure for the sealing chamber, connected with through orifices provided within this support, for example assuming the form of a plate made of marble, ceramic, titanium or any other suitable material known by those skilled in the art.

With regard to the heating of the stack needed to obtain fusion of the prepreg resin during the consolidation step, one provides that the tooling also includes heating means integrated to the support. Still for information, these heating means can assume the form of electrical resistances and/or channels for circulation of a coolant fluid, which are produced within the aforementioned support during manufacturing of the latter.

Alternatively, the tooling could be placed in a sterilizer in order to bring the stack to the desired temperature, without going outside the framework of the invention. However, the advantage of such tooling enabling performance of both the lay-up and the consolidation of the stack, is that the latter step can be done without having to move the tool incorporating the stacked, but not yet secured to each other, plies within it. Indeed, such an operation for moving the tooling creates risks of relative movements between the plies forming the stack, these risks above all being encountered when these plies are formed by a thermoplastic composite, due to the absence of natural adherence of these plies produced in such a material.

One can provide that the method is intended to obtain, at the end of the consolidation step of the stack, a substantially flat panel, the latter possibly being able to be intended to undergo later operations such as forming operations of the stamping type, these operations not, however, being part of the object of the present invention.

Alternatively, the method is intended to obtain, at the end of the consolidation step of the stack, a panel having a single curvature or a double curvature. For information, the single-curvature panels are called "developable" and have a rectilinear generatrix implying that they can be "unwound" on a plane. On the other hand, the double-curvature panels, such as the cockpit fuselage panels of an aircraft, are not "developable" and therefore do not have a rectilinear generatrix, i.e. they cannot be "unwound" on a plane. Indeed, they have a first curvature, for example in the longitudinal direction of the panel, as well as a second curvature different from the first, for example in the transverse direction of this same panel.

In such a case, one provides that the lay-up step is done such that following the placement of a given ply of fiber prepregs on other plies already stacked, the given ply is secured to at least one of the plies of fiber prepregs already stacked, using at least one welding spot. This thereby makes it possible to maintain the geometry of the stack made up for example of plies in thermoplastic composite which are not very adhesive to each other, and for which continuous welding of their respective edges connecting them to each other cannot always be done, in particular when this involves the manufacturing of a single- or double-curvature panel made up from successive plies not always having the same dimensions, and therefore being unable to be assembled two by two over their entire perimeter by such continuous welding due to the mismatching between certain edges of successive plies.

Furthermore, while this technique of spot welding of the plies of the stack is preferably used for to manufacture panels with curvatures, it can also be implemented to manufacture flat panels. However, in the latter case, the continuous welding of the edges of the successive plies constitutes a possible solution due to the usually identical dimensions of the different plies of the stack, even if the spot welding technique remains preferable.

As previously mentioned, the method is preferably applicable to the manufacturing of an aircraft fuselage panel, substantially flat, with a single curvature, or with a double curvature, having an area which can for example be between 10 and 30 $m^2$. To this end, it is noted that the panel obtained by the implementation of the method according to the present invention can be brought to undergo later operations in order to form a fuselage panel ready for assembly. These operations include, for example, an operation aiming to bring back stiffeners via continuous welding on the compacted panel, these stiffeners themselves being able to be realized by stamping of several planes also able to be obtained according to the method of the invention.

Other advantages and characteristics of the invention will appear in the detailed, non-limiting description below.

BRIEF DESCRIPTION OF THE DRAWINGS

This description will be done with regard to the appended drawings, in which.

DETAILED DESCRIPTION OF PREFERRED EMBODIMENTS

Figure 1A:
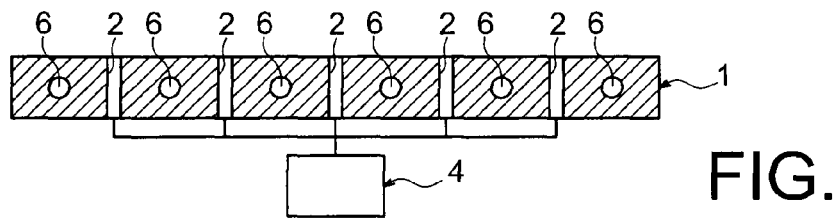
FIGS. 1$a$ to 1$k$ are views diagramming different operations performed during the implementation of a method for manufacturing a panel made of a composite material, according to a first preferred embodiment of the invention.
Figure 1B:
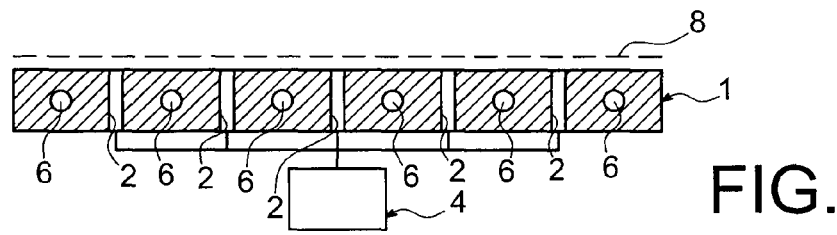
Figure 1C:
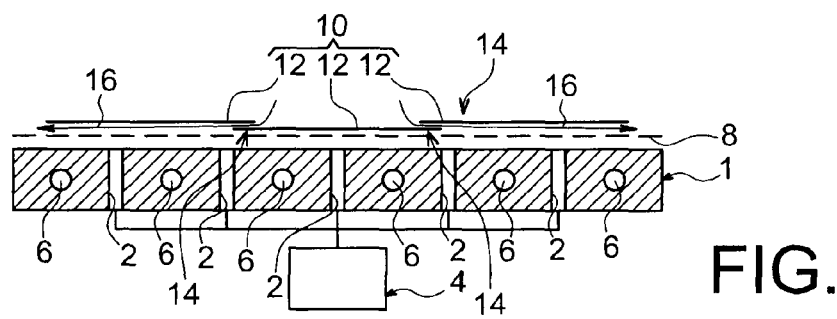
Figure 1D:
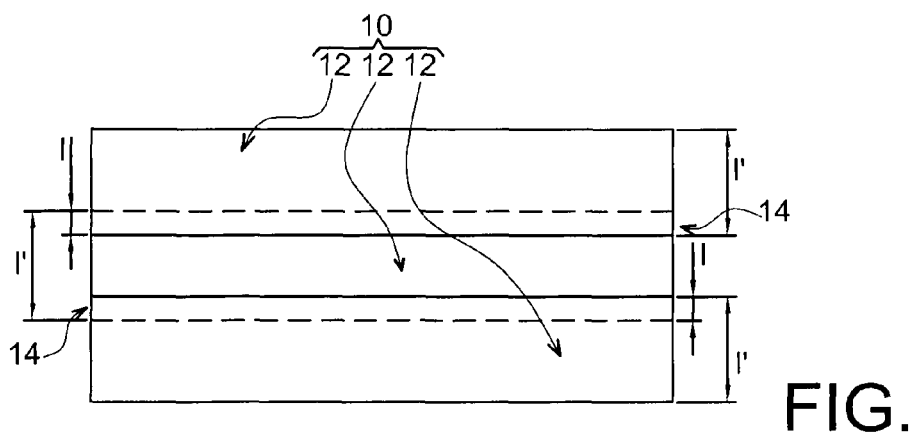

In reference first to FIGS. 1$a$ to 1$k$, one can see different successive operations performed during the implementation of a method for manufacturing a panel in a composite material, according to a first preferred embodiment of the present invention. In this first embodiment, the panel which one wishes to obtain has a substantially flat shape, and for example globally square or rectangular, and has a thickness between 1 and 20 mm. For information, it is noted that this finds a particular application in the aeronautics as field as a fuselage panel for an aircraft, including a fiber ratio close to 65%, for example.

In FIG. 1$a$, one can see that the tooling used for the implementation of this method first comprises a support which can be likened to a marble plate referenced 1. This plate 1 is passed through perpendicularly, relative to the plane along which it extends, by a plurality of through orifices 2 provided within this marble plate 1. As will be detailed more explicitly below, the through orifices 2 are connected to negative pressure means 4, using a traditional fluid communication network (not referenced) and able to assume any form known by those skilled in the art.

Furthermore, the marble plate 1 is equipped with heating means here assuming the form of a plurality of mechanical resistances or coolant fluid circulation channels 6, which are provided integrally inside this marble plate 1 serving as support.

The method according to the first preferred embodiment is initiated by placing a drainage fabric 8 on the plate 1, this fabric subsequently being called second tissue 8. It is, for example, formed in a manner known by those skilled in the art by glass fabric, such as fine glass fabric (Ref: 2165 Z6040) or coarse glass fabric (ref: 7628 TF 970) from the company HEXCEL Fabrics®. This second drainage fabric 8, diagrammed in FIG. 1$b$, makes it possible to ensure air evacuation from the stack of plies in composite material designed to rest above this second fabric 8, during the later consolidation step of this stack aiming to compact the latter, as will emerge more clearly below.

Then, one places a set of polyimide films partially covering each other, this set referenced 10 in FIG. 1$c$ subsequently being called second set of polyimide films. Thus, this second set 10 is formed by a plurality of polyimide films 12, here three, which partially cover each other, and more particularly two by two over so-called covering or overlapping zones. Preferably, one provides that each of the films 12 is present in the form of a strip, and that these strips are arranged parallel to each other as clearly shown in FIG. 1d, even if it is alternatively possible to consider that these strips are slanted relative to the longitudinal and transverse directions of the panel designed to be obtained. Thus, the covering zones 14 can also be likened to strips with a smaller width oriented according to the same arrangement direction as the films 12. One preferably provides that the set 10 never has more than two films 12 superimposed on each other at a given point. As shown diagrammatically by the arrows 16 in FIG. 1c, it is noted that the covering zones 14 are advantageous in that they allow the passage of air and gas during the later consolidation step of the stack, given that at these same zones 14, the sealing of the set 10 is advantageously not completely ensured. For information, the widths "l" of the covering zones 14 and the widths "l'" of the strips of polyimide films 12 vary according to the curvature of the panel. Thus, one preferably provides for using strips with a width "l'" of approximately 254 mm (10 inches) to manufacture flat panels having a total area smaller than 2 m$^2$, whereas in the case where the total area of the flat panel is greater than 2 m$^2$, one preferably provides for using strips with a width "l'" of approximately 350 mm (13.8 inches).

Furthermore, in the case of a panel with curvature(s), the width "l'" of the component strips is in the vicinity of 350 mm (13.8 inches) for small curvatures, and in the vicinity of 254 mm (10 inches) for pronounced curvatures.

Furthermore, regardless of the geometry of the panel, the width "l" of the covering zones 14 is preferably fixed in the vicinity of 15 mm.

The polyimide films 12 used, also called thermalimides, are of course chosen to resist high temperatures which can reach 400° C. or more, such as those encountered during the consolidation step of the stack aiming in particular to ensure the fusion of the resin of the plies pre-soaked with composite material. The thickness of these films 12 is preferably between approximately 20 and 50 μm, and the arrangement as well as the number of these same second films 12 are determined such that they can prevent contact between the stack of plies deposited later and the marble plate 1.

The manufacturing method is continued by performing a lay-up step consisting of making a stack 18 of a plurality of plies of fiber prepregs 20, along a stack direction 21 substantially orthogonal to the plane (not referenced) in which the marble plate 1 extends. Thus, the plies 20, preferably produced in thermoplastic composites, for example with PEEK resin or PPS resin thermoplastic matrix and long carbon fibers, are therefore arranged above each other in this stack direction 21. Naturally, the number of these plies 20 each forming a layer of the stack is determined according to the desired final thickness of the panel.

Figure 1E:
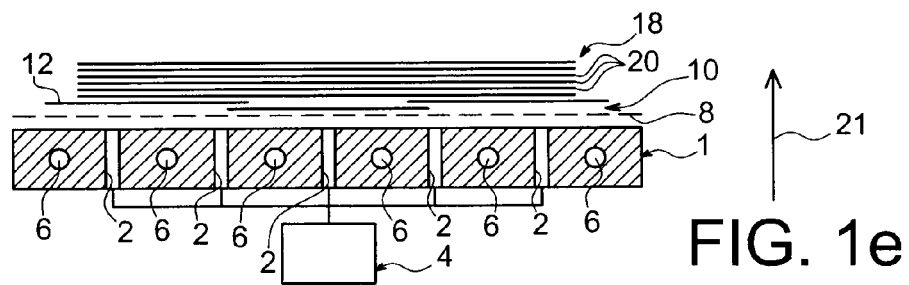

In FIG. 1e, one can see that the lower surface of this stack 18, considered in the direction 21, is entirely in contact with the second set of polyimide films 10. This makes it possible to ensure, for the stack later compacted, a lower surface having a surface state of very good quality, perfectly compatible with the requirements of the aeronautical field. For information, it is noted that as the plies of fiber prepregs 20 are arranged above each other, the last ply deposited can be secured to the assembly already stacked, preferably using one or several weld spots for example located at the ends of each of these plies, these usually having a substantially square or rectangular shape. This makes it possible to avoid relative movements between the different plies 20 within the stack, which are indeed likely to take place due to the weak mutual adherence attached to these plies in thermoplastic composite. It is specified that continuous welding is also possible in order to ensure maintenance of this type without going beyond the framework of the invention.

Figure 1F:
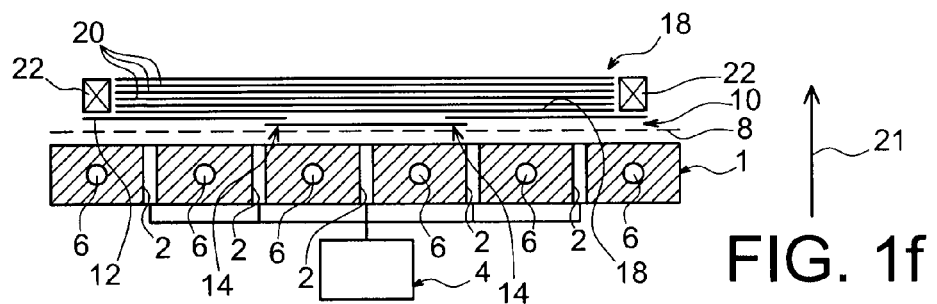
Figure 1G:
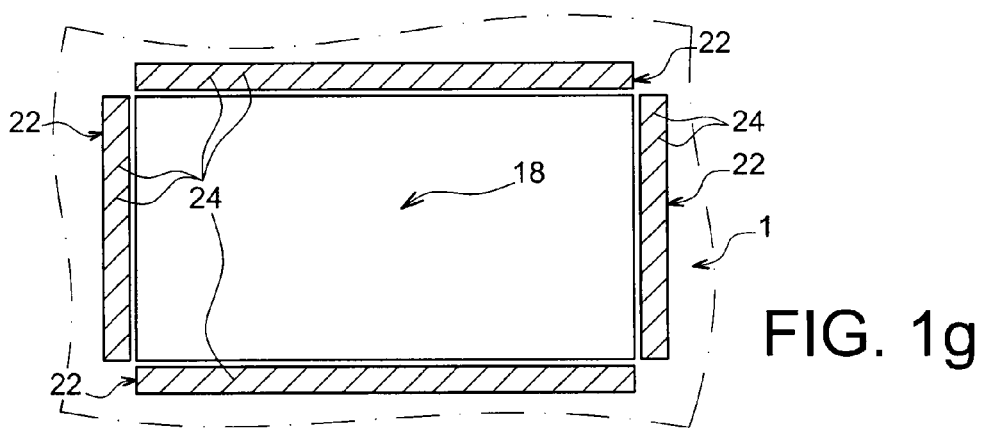

In reference now to FIG. 1f, one can see that the method continues by arranging wedges 22 limiting edge effects likely to occur during the later consolidation step of the stack 18. These wedges are preferably provided all around the stack 18 as shown in FIG. 1g, and therefore each go alongside the length of an edge of this stack. These wedges 22, which could alternatively be placed on the support 1 prior to performance of the lay-up step, are maintained fixed on the latter plate 1 using suitable assembly means, such as an adhesive tape resisting high temperatures. The aforementioned assembly is done such that these wedges 22 can still be located above the second drainage fabric 8 and the second set of polyimide films 10, while being in contact with the latter.

The thickness of these wedges, corresponding to their dimension in the direction 21, is approximately equal to that of the panel designed to be obtained from this stack 18. This specificity clearly makes it possible to control the consolidation operation aiming to compact the stack 18, given that the thickness of this panel therefore cannot be smaller than that of the wedges 22 mounted on the plate 1. For information, this wedge thickness is provided to be approximately smaller by a size of 0.1 mm to 0.5 mm than that of the final panel designed to be obtained.

Furthermore, in order to ensure satisfactory drainage of the gas in combination with the second drainage fabric 8 and the first drainage fabric which will be described later, each of the wedges 22 has drainage grooves or ridges 24 formed on their upper surface and/or lower surface, as shown diagrammatically by FIG. 1g.

Furthermore, these wedges can each be blocked in the direction transverse to them, and more precisely in the direction going away from the stack, for example using stops provided on the support 1. However, it is also possible to provide for cases where these wedges are entirely free in translation on the support 1, without going outside the framework of the invention.

Moreover, it is alternatively possible to provide for wedges whereof the thickness is slightly larger than that of the final panel, for example with a size in the vicinity of 0.1 to 0.5 mm. In such a case, these wedges completely eliminating the edge effects are provided to be deformable by compression during the consolidation step, in order to be able to obtain the panel with the desired thickness.

Then, one again places a set of polyimide films 26, called first set of polyimide films, and made up of a plurality of films 30 partially covering each other. This second set 26 is identical or similar to the first set 10 described above, insofar as it is, for example, made up of three (or more) polyimide films 28 partially covering each other, and more particularly two by two on so-called covering or overlapping zones. Preferably, one provides that each of the films 28 is in the form of a strip, and that these strips are arranged parallel to each other, as clearly shown in FIG. 1i. Thus, the covering zones 30 can also be likened to strips with a smaller width oriented in the same arrangement direction as the films 28. One preferably provides that the set 26 never has more than two films 28 superimposed on each other at a given point. As shown diagrammatically by the arrows 32 in FIG. 1h, it is noted that the recovery zones 30 are advantageous in the sense that they allow the passage of air and gases during the later consolidation step of the stack, like the recovery zones 14 of the first set 10.

Still for information, the widths "l" of the covering zones 30 and the widths "l'" of the strips of polyimide films 28 are as described above, and preferably identical to those adopted for the second set of polyimide films. Furthermore, the polyimide films 28 used are of the same type as those of the first set, namely chosen to resist high temperatures able to reach 400° C. or more, such as those encountered during the consolidation step of the stack aiming in particular to ensure the fusion of the resin of the plies pre-soaked in composite material. Here again, the thickness of the films 28 is preferably between approximately 20 and 50 µm, and the arrangement as well as the number of these same first films 28 are determined such that they can prevent contact between the stack of plies 20 deposited, and the compacting plate placed later. To do this, as shown diagrammatically in FIG. 1i, the first set 26 is provided to extend over the entire upper surface of the stack 18, but also to overhang on each of the wedges 22, which can possibly also be completely covered by the first films 28. As shown in FIG. 1i, in the longitudinal direction of the strips 28, these preferably slightly exceed the wedges 22, which is not the case for the other wedges arranged transversely. To this end, one could even provide that the strips 28 do not cover these same wedges 22 arranged transversely, without going beyond the framework of the invention.

Insofar as the upper surface of this stack 18, considered in the direction 21, is entirely in contact with the first set of polyimide films 26, this also makes it possible to ensure, for the stack later compacted, an upper surface having a very high-quality surface state, perfectly compatible with the requirements of the aeronautic field.

Figure 1H:
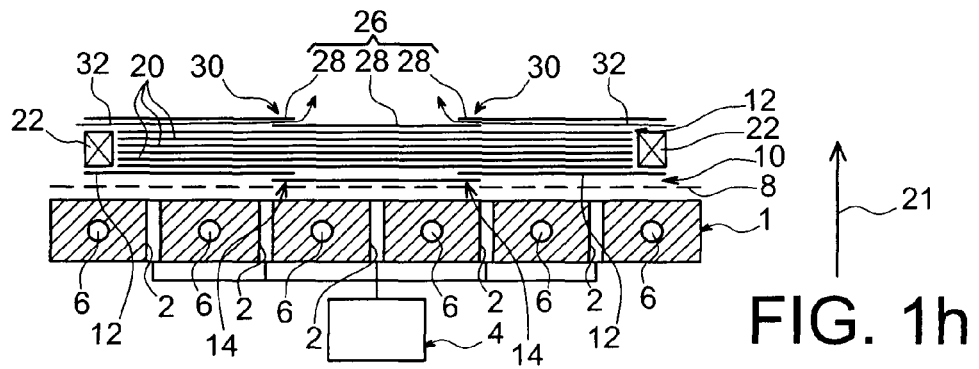
Figure 1I:
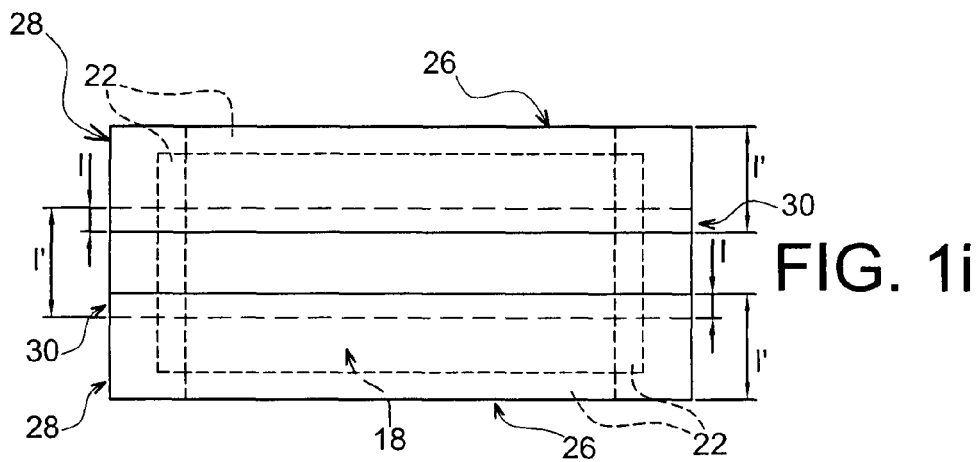

As is best visible in FIG. 1h, the covering/overlapping zones 30 of the first set 26 are each located across from one of the covering/overlapping zones 14 of the second set 10, in the direction 21. Nevertheless, it would also be possible to offset these overlapping zones 14, 30, namely to arrange them other than by placing them across from each other two by two in this same direction 21. However, it is advisable for these overlapping zones 14, 30 preferably to remain all in contact with the lower surface or the outer surface of the stack not yet compacted, i.e. in contact with the first or last ply 20 deposited.

Figure 1J:
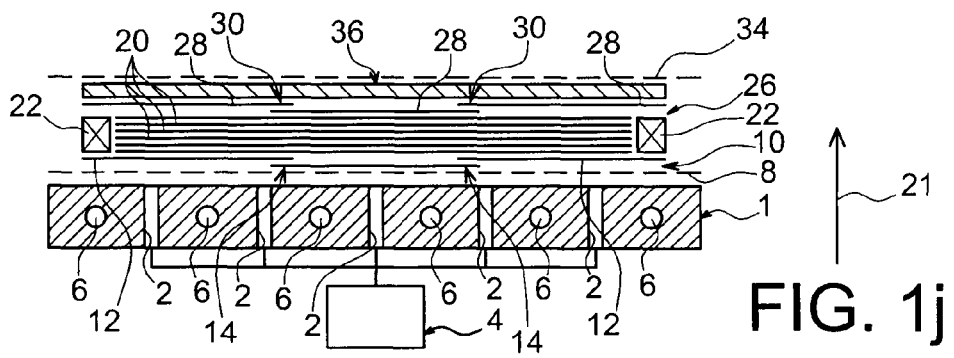

As shown in FIG. 1j, and prior to the consolidation step of the stack 18, a step is done to place a compacting plate 36, also called caulking plate or sheet, produced in a traditional metal material such as a stainless steel. This plate 36 is arranged above the stack 18, such that its lower compacting surface is in contact with the first set 26 of polyimide film 28. As shown diagrammatically by FIG. 1j, its dimensions are provided in order to possibly be able to abut against each of the wedges 22 provided all around the stack 18. Naturally, the compacting plate 36 is arranged substantially parallel to the plate forming the support 1, given that the desired panel must have a substantially flat shape.

The manufacturing method is continued by placing a first drainage fabric 34 above the compacting plate 36, as also shown in FIG. 1j. Of course, it is noted that this first drainage fabric 34 has a role identical to that played by the second drainage fabric 8 previously described, the only difference between these two fabrics 8, 34 being that they are designed to be connected to a lower surface of the stack 18 and to an upper surface of said stack, respectively. For this reason, it can therefore be a fabric of the same type, having the same drainage properties.

Figure 1K:
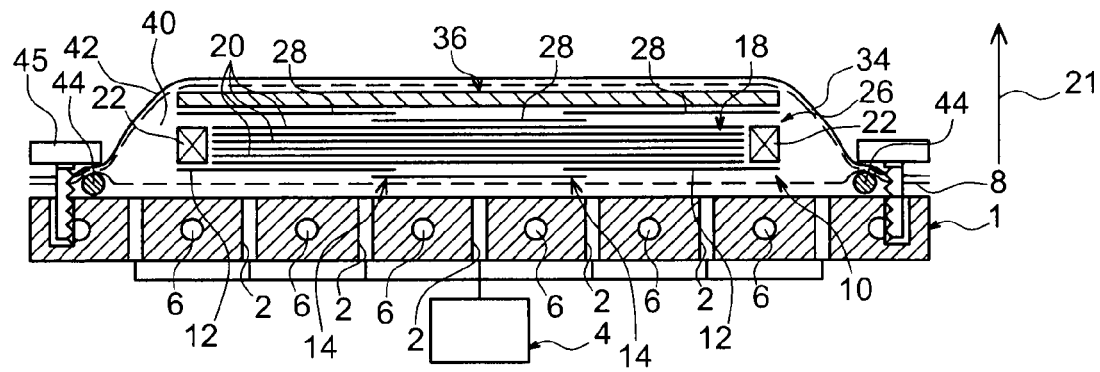

The last operation performed before implementation of the consolidation step of the stack 18 consists of creating a sealing chamber 40 using the marble plate 1, on which one mounts a sealing bladder 42 covering all of the aforementioned elements, as visible in FIG. 1k. To do this, the bladder 42 is stuck all around the stack 18 on the marble plate 1 using one or several set screws 45 screwed into the latter part, the screw head 45 squeezing a sealing device 44 resting in contact with this same plate 1. For information and as shown in the figure, the two drainage fabrics 8 and 34 can also be stuck on the sealing device 44 via the set screw 45, by placing them between the bladder 42 and this same sealing device 44.

Thus, the plate 1 and the sealing bladder 42 together form a sealing chamber 40 within which the stack of plies of fiber prepregs 20 is found, which can then undergo said consolidation operation aiming globally to compact this stack 18.

To do this, one simultaneously implements the heating means 6, as well as the negative pressure means 4 making it possible to create a vacuum inside the chamber 40 using through orifices 2 located within the plate 1, and opening in this same chamber 40. More precisely, the heating means are actuated so as to apply a temperature in the vicinity of 400° C. within the stack 18, so as to cause the fusion of the resin necessary for compacting of this stack. Naturally, as previously mentioned, the polyimide films 20 and 28 are designed to bear such temperatures, such that they are not damaged during the consolidation step. When the vacuum is produced inside the chamber 40 through the orifices 2, the bladder 42 then applies pressure on the compacting plate 36 which thus tends to come closer to the support plate 1 by moving orthogonally to the direction of the stack 21. Thus, by moving in this way under the action of the bladder 42, the plate 36 in contact with the first set of polyimide films 26 creates sticking of the plies 20 in the stack direction 21 against the plate 1, these plies then tending to compact and become integral with each other thanks to the fusion of the prepreg resins on these same plies. This consolidation step is done until the panel obtained by compacting has a thickness in the direction 21 which is the desired thickness, and is at any rate capped by the thickness of the wedges 22, when this is provided to be slightly smaller than the final thickness of the panel. When this target thickness is reached, at the end of the consolidation step, the chamber 40 is opened by withdrawing the bladder 42, and the compacted stack obtained forming the desired panel can then be removed from the tooling.

For information, the chamber 40 is opened by removing the bladder 42 and the compacted stack obtained forming the desired panel can then be removed from the tooling. It may potentially be necessary to remove the polyamide films 12, 28 which continue to adhere to the upper and/or lower surfaces of the obtained panel. However, it is noted that the polyimide/thermalimide films are usually such that at the end of the consolidation step of the stack 18, they do not adhere to any of the other elements provided to perform this step, such that their removal advantageously does not constitute any particular problem.

Figure 2:
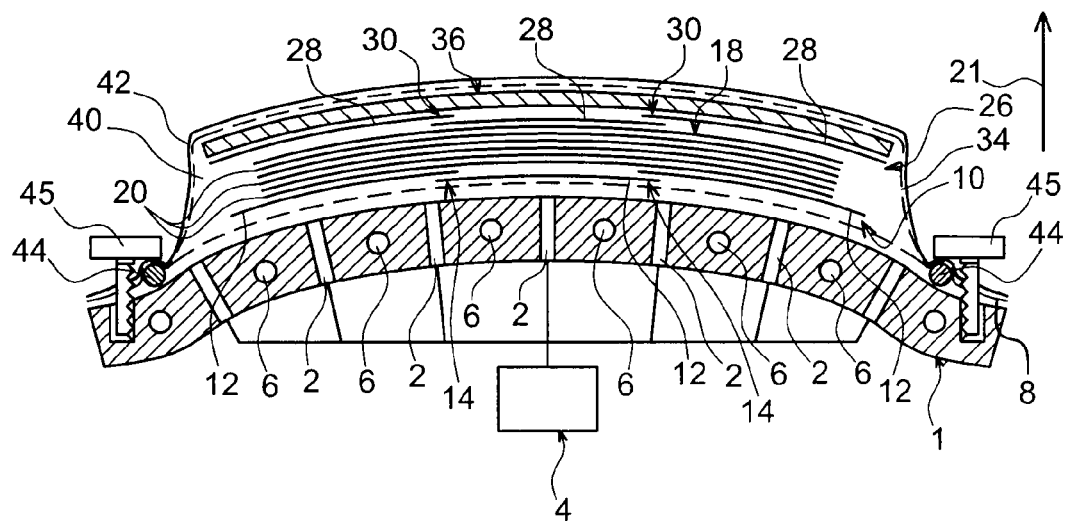
FIG. 2 is a view diagramming a step performed during implementation of a method for manufacturing a panel made of a composite material, according to a second preferred embodiment of the present invention.

Now in reference to FIG. 2, one can see a second preferred embodiment according to the present invention, the aim of which is no longer to obtain a substantially flat panel, but a panel with a single or double curvature.

For information, this type of panel is traditionally found in the aeronautic field, as a fuselage panel of an aircraft.

FIG. 2 illustrates the state of the tooling and the stack of plies as they exist just before the consolidation step of this same stack is carried out. It therefore corresponds to the state shown in FIG. 1k in the case of the first preferred embodiment of the invention.

As one can see in this FIG. 2, all of the operations having led to this assembly are similar to those described for the first embodiment in reference to FIGS. 1a to 1k. It is noted that this assembly nevertheless differs from that encountered in the first embodiment by the shape of certain elements of the tooling used, as well as by the absence of wedges limiting the edge effects which were not provided for. Nevertheless, these could be arranged in the same way as described for the first embodiment without going beyond the framework of the invention.

Thus, in order to obtain the single or double curvature for the fuselage panel, the marble support 1 no longer assumes the form of a flat plate, but has a geometry which is complementary to that desired for one of the two surfaces of the panel. Similarly, the compacting plate 36 has a compacting surface which is no longer flat, but which has a geometry with a shape complementary to that of the other of the two surfaces needing to be produced for the panel. Of course, although FIG. 2 shows a concave support surface and a convex compacting surface of the plate 36, an inverted configuration between these convex and concave surfaces (each with single or double curvatures) could naturally be considered without going beyond the framework of the invention.

Another difference with the first preferred embodiment lies in the securing between the different layers 20 in thermoplastic composite of the stack 18, which have a weak adherence. Indeed, given that the single or double curvatures sought for the panel leads to the superposition of strips having different widths, the mismatch between the edges of these strips therefore sometimes prevents securing of two directly consecutive strips by continuous welding all around them. To face this problem, we then consider, instead of welding these plies all around their perimeter, welding them by one or several carefully chosen weld spots. This manner of proceeding can be adopted for securing each of the plies of fibers 20 beginning from the second one in the stack, given that the first naturally cannot be secured on the support 1 in this way. Thus, in order to ensure correct maintenance of the first ply of the stack 18 relative to this same marble support 1, sticking of this first ply 20 against the surface of the support of the plate 1 can be re-implemented, via negative pressure application done using the means 4. Indeed, when aspiration is done using these same means 4, even before the bladder 42 has been placed on the support 1, the air sucked in through the through orifices 2 advantageously causes sticking of the first ply 20 of the stack 18 against this same marble support 1. This thereby makes it possible to use the negative pressure application means 4 for a purpose other than the main purpose aiming to later provide the vacuum within the sealing chamber 40, in order to perform the consolidation step of the stack 18.

Another particularity of this second preferred embodiment of the present invention consists of obtaining the precise shape of the compacting plate 36, constituting part of the tooling. Indeed, this plate 36 is advantageously made in a material including mica and resin, as described in patent application BE 758 263, or also found under the commercial brand MIGLASIL® offered by the company VON ROLL ISOLA®, which grants it properties enabling it to be deformable during the first heating up, and to become extremely stiff once this first heating up is completed. As a result, this plate 36 is produced in the aforementioned material, and coarsely preformed to approach the final geometry required. During its first use for the production of a panel with single or double curvatures, this preformed plate is arranged in the manner previously described, namely on the first set of polyimide films 26. Then, during the consolidation step of the stack of plies of fibers at high temperature, the compacting plate 36 will on one hand deform, sticking against this stack 18, and will simultaneously reach its firing temperature from which this plate 36 becomes stiff. As a result, it is only once this plate has been totally formed to the stack 18 under the effect of the pressure applied by the sealing bladder 42 that this will adopt its precise final form, which can then be kept during all later heating up, due to the specific properties of the material used.

Thus, this plate 36 with very precise curvature can then be used to produce subsequent panels using this same tooling, since it will be perfectly capable of preserving, during the following compacting steps at high temperatures, its precise shape adopted during the first firing.

Without going beyond the framework of the invention, it would alternatively be possible to provide a plate manufactured so as to have its precise definitive shape directly, without it therefore being necessary to resort to the manufacturing of a first panel to obtain this shape.

Of course, various changes may be made by one skilled in the art to the invention which has just been described, solely as non-limiting examples.

The invention claimed is:

1. A method for manufacturing a panel in a composite material using a tooling including a support, comprising:
    performing a lay-up on the support of the tooling so as to produce a stack of plies of fiber prepregs;
    consolidating the stack of plies to obtain the panel using a compacting plate arranged above the stack of plies;
    arranging a first set of polyimide films in contact with the stack of plies, between the stack of plies and the compacting plate, such that adjacent polyimide films partially overlap along adjacent edges thereof forming overlapping zones between the adjacent polyimide films;
    arranging a second set of polyimide films in contact with the stack of plies, between the stack and the support of the tooling, such that adjacent polyimide films of the second set of polyimide films partially overlap along adjacent edges thereof forming overlapping zones between the adjacent polyimide films of the second set of polyimide films; and
    creating a vacuum via a plurality of through orifices disposed within the support across the arranged polyimide films, so as to equalize air evacuation through a plurality of the overlapping zones between the adjacent polyimide films,
    wherein a width of the overlapping zones is approximately 15 mm.

2. The manufacturing method according to claim 1, further comprising:
    placing on the compacting plate a first drainage fabric, such that the first fabric is located in contact with the compacting plate and separated from the first set of polyimide films by the compacting plate; and
    placing on the support of the tooling a second drainage fabric, such that the second drainage fabric is located in contact with the support of the tooling, between the support and the second set of polyimide films.

3. The manufacturing method according to claim 1, further comprising placing at least one wedge so as to limit edge effects, which are likely to occur during the step of consolidating the stack, each wedge being arranged along an edge of the stack.

4. The manufacturing method according to claim 3, wherein each wedge limiting the edge effects has a thickness approximately equal to that of the panel to be obtained from the stack, upon completion of the step of consolidating the stack.

5. The manufacturing method according to claim 3, wherein each wedge limiting the edge effects has at least one surface including a plurality of drainage grooves.

6. The manufacturing method according to claim 3, wherein each wedge limiting the edge effects has an initial thickness greater than that of the panel to be obtained from the stack, upon completion of the step of consolidating the stack, each wedge being designed and arranged so as to be deformed by compression by the compacting plate, during the step of consolidating the stack.

7. The manufacturing method according to claim 1, wherein the step of consolidating the stack is performed by applying negative pressure within a sealing chamber partially defined by the support and in which the stack of plies and the compacting plate are located, and by performing heating of the stack of plies of fiber prepregs.

8. The manufacturing method according to claim 7, wherein the tooling further includes a negative pressure application mechanism for the sealing chamber, connected to through orifices disposed within the support.

9. The manufacturing method according to claim 8, wherein the support is a marble plate.

10. The manufacturing method according to claim 7, wherein the tooling further includes a heating mechanism for the stack of plies of fiber prepregs, the heating mechanism being integrated with the support.

11. The manufacturing method according to claim 1, wherein upon completion of the step of consolidating the stack, a substantially flat panel is obtained.

12. The manufacturing method according to claim 1, wherein upon completion of the step of consolidating the stack, a panel having a single curvature is obtained.

13. The manufacturing method according to claim 1, wherein upon completion of the step of consolidating the stack, a panel having a double curvature is obtained.

14. The manufacturing method according to claim 12, wherein the lay-up is performed such that following placement of a given ply of fiber prepregs on other already-stacked plies, the given ply is secured to at least one of the plies of already-stacked fiber prepregs, using at least one weld point.

15. The manufacturing method according to claim 1, wherein an aircraft fuselage panel is manufactured.

16. The manufacturing method according to claim 1, wherein each overlapping zone between the adjacent polyimide films includes no more than two polyimide films.

17. The manufacturing method according to claim 1, wherein the second set of polyimide films is arranged such that adjacent polyimide films of the second set of polyimide films partially overlap along adjacent edges thereof forming overlapping zones between the adjacent polyimide films of the second set of polyimide films.

18. The manufacturing method according to claim 17, wherein each overlapping zone between the adjacent polyimide films of the second set of polyimide films includes no more than two polyimide films of the second set of polyimide films.

* * * * *